United States Patent
Sakaguchi et al.

(10) Patent No.: US 8,968,484 B2
(45) Date of Patent: Mar. 3, 2015

(54) LIFTING AND DRYING DEVICE AND METHOD OF MANUFACTURING MAGNETIC RECORDING MEDIUM SUBSTRATE OR MAGNETIC RECORDING MEDIUM USING THE SAME

(75) Inventors: Ryuji Sakaguchi, Chiba (JP); Ryo Tanaka, Ichihara (JP); Norio Oshima, Ichihara (JP)

(73) Assignee: Showa Denko K.K., Tokyo (JP)

( * ) Notice: Subject to any disclaimer, the term of this patent is extended or adjusted under 35 U.S.C. 154(b) by 731 days.

(21) Appl. No.: 13/210,884

(22) Filed: Aug. 16, 2011

(65) Prior Publication Data

US 2012/0042910 A1    Feb. 23, 2012

(30) Foreign Application Priority Data

Aug. 18, 2010    (JP) ................. P2010-183211

(51) Int. Cl.
*B08B 1/02* (2006.01)
*G11B 5/84* (2006.01)

(52) U.S. Cl.
CPC ................. *G11B 5/8404* (2013.01)
USPC .......................................... 134/32; 134/25.4

(58) Field of Classification Search
None
See application file for complete search history.

(56) References Cited

U.S. PATENT DOCUMENTS

| | | | |
|---|---|---|---|
| 2005/0124518 A1 * | 6/2005 | Sugimoto et al. | 510/212 |
| 2008/0078426 A1 | 4/2008 | Miya et al. | |

FOREIGN PATENT DOCUMENTS

| | | | |
|---|---|---|---|
| CN | 101047115 A | | 10/2000 |
| CN | 1938830 A | | 3/2007 |
| CN | 101599423 A | | 12/2009 |
| JP | 08-045894 A | | 2/1996 |
| JP | 09206705 A | * | 8/1997 |
| JP | 10-189529 A | | 7/1998 |
| JP | 2782838 B2 | | 8/1998 |
| JP | 2001-096245 A | | 4/2001 |
| JP | 2003-257017 A | | 9/2003 |

OTHER PUBLICATIONS

Chinese Office Action dated Nov. 5, 2013 issued in corresponding application No. 201110235514.1.

* cited by examiner

*Primary Examiner* — Eric Golightly
(74) *Attorney, Agent, or Firm* — Sughrue Mion, PLLC

(57) ABSTRACT

Provided is a method of manufacturing a magnetic recording mediums comprising employing a lifting and drying device for cleaning substrates by immersing one or more disk-like substrates with a central hole into a cleaning liquid disposed in a cleaning tank and lifting and drying the substrates, the lifting and drying device including: a hanger mechanism that is inserted through the central hole of the substrates and supports a plurality of the substrates while being hung thereon; an elevation mechanism that elevates the hanger mechanism between a position where the substrates are immersed into the cleaning liquid inside the cleaning tank and a position where the substrates are lifted from the cleaning tank; and an ejection mechanism that is disposed in the cleaning tank and ejects the cleaning liquid from the downside of the hanger mechanism toward the substrate.

8 Claims, 2 Drawing Sheets

LIFTING AND DRYING DEVICE AND METHOD OF MANUFACTURING MAGNETIC RECORDING MEDIUM SUBSTRATE OR MAGNETIC RECORDING MEDIUM USING THE SAME

BACKGROUND OF THE INVENTION

1. Field of the Invention

The present invention relates to a lifting and drying device that cleans a substrate by immersing a disk-like substrate with a central hole into a cleaning liquid disposed in a cleaning tank and lifts and dries the substrate, and a method of manufacturing a magnetic recording medium substrate or a magnetic recording medium using the same.

Priority is claimed on Japanese Patent Application No. 2010-183211, filed on Aug. 18, 2010, the content of which is incorporated herein by reference.

2. Description of Related Art

For example, a disk-like magnetic recording medium substrate with a central hole has been used as a hard disk drive mounted on an information device or the like. Such a magnetic recording medium substrate is manufactured by performing various treatments such as cutting, grinding, polishing, sputtering, and plating on a substrate formed of an aluminum alloy, glass or the like. After such treatments, cleaning and drying of the surface of the substrate is performed.

However, in recent years, the recording density of magnetic recording media has been further increased due to the demand for a large storage capacity of a recording medium and a compact size of an information device or the like. In such a magnetic recording medium substrate or magnetic recording medium using the same, high flatness is demanded which is capable of achieving a reduction of a floating height of a magnetic head running on the recording surface thereof in a floating state.

For this reason, in the magnetic recording medium substrate and the magnetic recording medium, a high-level cleaning method capable of removing dust or the like adhering to the surface of the substrate after performing various surface treatments such as polishing and sputtering thereon, and a drying method for cleanly drying the cleaned substrate are demanded.

Conventionally, as a method of cleaning and drying the substrate, in the case of a substrate with a large diameter, a method has been performed in which a plurality of substrates is received inside a container which is called as a carrier, is scrubbed and cleaned by a plurality of cleaning brushes while being conveyed inside a liquid, and is rotated to be spun and dried.

Furthermore, a cleaning device is proposed which sets a magnetic disk substrate or the like as a workpiece and cleans the substrate using a liquid of a plurality of cleaning tanks by conveying the substrate through a conveyor in order to remove foreign matter adhering to the surface of the workpiece after performing a surface treatment such as polishing on the surface thereof (refer to Japanese Unexamined Patent Application, First Publication No. 2001-96245).

Furthermore, a wafer drying device is proposed which sets a semiconductor substrate as a wafer, accommodates a cassette accommodating a plurality of wafers inside a cradle, and rotates the cradle while holding the wafers so as to be parallel to each other using a member with V-shaped grooves in order to prevent water droplets or dust from remaining on the wafer (refer to Japanese Unexamined Patent Application, First Publication No. 8-45894).

Furthermore, there is proposed a spinning and drying device that removes a cleaning liquid adhering to a disk with a central hole by rotating the disk, wherein a part of a contact portion where a chuck member chucking the outer peripheral portion of a disk and the disk to be chucked contact each other is set as a non-contact portion where the chuck member and the disk do not contact each other, so that a cleaning liquid retained at the chuck member is efficiently removed (refer to Japanese Unexamined Patent Application, First Publication No. 2003-257017).

Furthermore, there is provided a spinning and drying device that removes a cleaning liquid adhering to a disk with a central hole by rotating the disk, wherein the disk is chucked in an upright state by a chuck member chucking the inner peripheral portion of the disk, and an air supply unit is provided to supply air backward in the rotation direction of the contact portion between the chuck member and the disk, so that the cleaning liquid retained at the chuck member is efficiently removed (refer to Japanese Patent No. 2782838).

Furthermore, as a method of drying a wafer-like substrate, a lifting and drying method is known (refer to Japanese Unexamined Patent Application, First Publication No. 10-189529). The lifting and drying method is a method of immersing a cleaned wafer into pure water while holding it by a chucking device, raising the chucking device so as to raise the upper portion of the wafer from the pure water and remove the pure water from the exposed portion, and lifting the entire surface of the wafer from the pure water so as to dry the wafer.

Since the above-described lifting and drying method has a device with a simple structure and may process a plurality of substrates at the same time, the method has been widely used as a method of drying a wafer-like substrate. However, the lifting and drying method is not readily used to dry the magnetic recording medium substrate or the magnetic recording medium. That is, when the lifting and drying method is used, for example, as schematically shown in FIGS. 3A to 3C, pure water W rising due to the surface tension splashes back at the time when a substrate D moves away from the pure water W, and bursting liquid droplets P adhere to the substrate D again. Furthermore, in many cases, contaminants are condensed at the liquid droplets P adhering to the substrate D again, so that the contaminants form a drying stain on the substrate D. Then, since the drying stain is formed on the recording surface of the magnetic recording medium, the position of the drying stain becomes a bad sector of the magnetic recording medium.

SUMMARY OF THE INVENTION

The invention is made in view of such circumstances, and it is an object of the invention to provide a lifting and drying device capable of preventing drying stains from being generated when lifting and drying a disk-like substrate after cleaning the substrate by immersing the substrate with a central hole into a cleaning liquid inside a cleaning tank and a method of manufacturing a magnetic recording medium substrate or a magnetic recording medium using the same.

In order to solve the above-described problem, the invention provides the following means.

(1) A lifting and drying device for cleaning a substrate by immersing one or more disk-like substrates with a central hole into a cleaning liquid disposed in a cleaning tank and lifting and drying the substrates, the lifting and drying device including:

a hanger mechanism that is inserted through the central hole of the substrates and supports the substrates while being hung thereon;

an elevation mechanism that elevates the hanger mechanism between a position where the substrates are immersed into the cleaning liquid inside the cleaning tank and a position where the substrates are lifted from the cleaning tank; and an ejection mechanism that is disposed in the cleaning tank and ejects the cleaning liquid from the downside of the hanger mechanism toward the substrates.

(2) The lifting and drying device according to (1), further including: a blowing mechanism that blows a dry ambient gas to the substrates lifted from the surface of the cleaning liquid from the upside thereof.

(3) The lifting and drying device according to (1) or (2), wherein the lifting speed of the substrates is from 0.01 to 30 mm/s.

(4) The lifting and drying device according to any one of (1) to (3), wherein the flow rate of the cleaning liquid ejected from the ejection mechanism is from 0.1 to 100 cm/s.

(5) The lifting and drying device according to any one of (2) to (4), wherein the flow rate of the dry ambient gas ejected from the blowing mechanism is from 0.1 to 50 cm/s.

(6) The lifting and drying device according to any one of (1) to (5), wherein the cleaning liquid contains hydrogen water.

(7) The lifting and drying device according to any one of (1) to (6), wherein the substrates are magnetic recording medium substrates or a magnetic recording media.

(8) A method of manufacturing a magnetic recording medium substrate, the method including: cleaning the magnetic recording medium substrates using the lifting and drying device according to any one of (1) to (6).

(9) A method of manufacturing a magnetic recording medium, the method including: cleaning the magnetic recording medium using the lifting and drying device according to any one of (1) to (6).

DETAILED DESCRIPTION OF THE INVENTION

Figure 1:
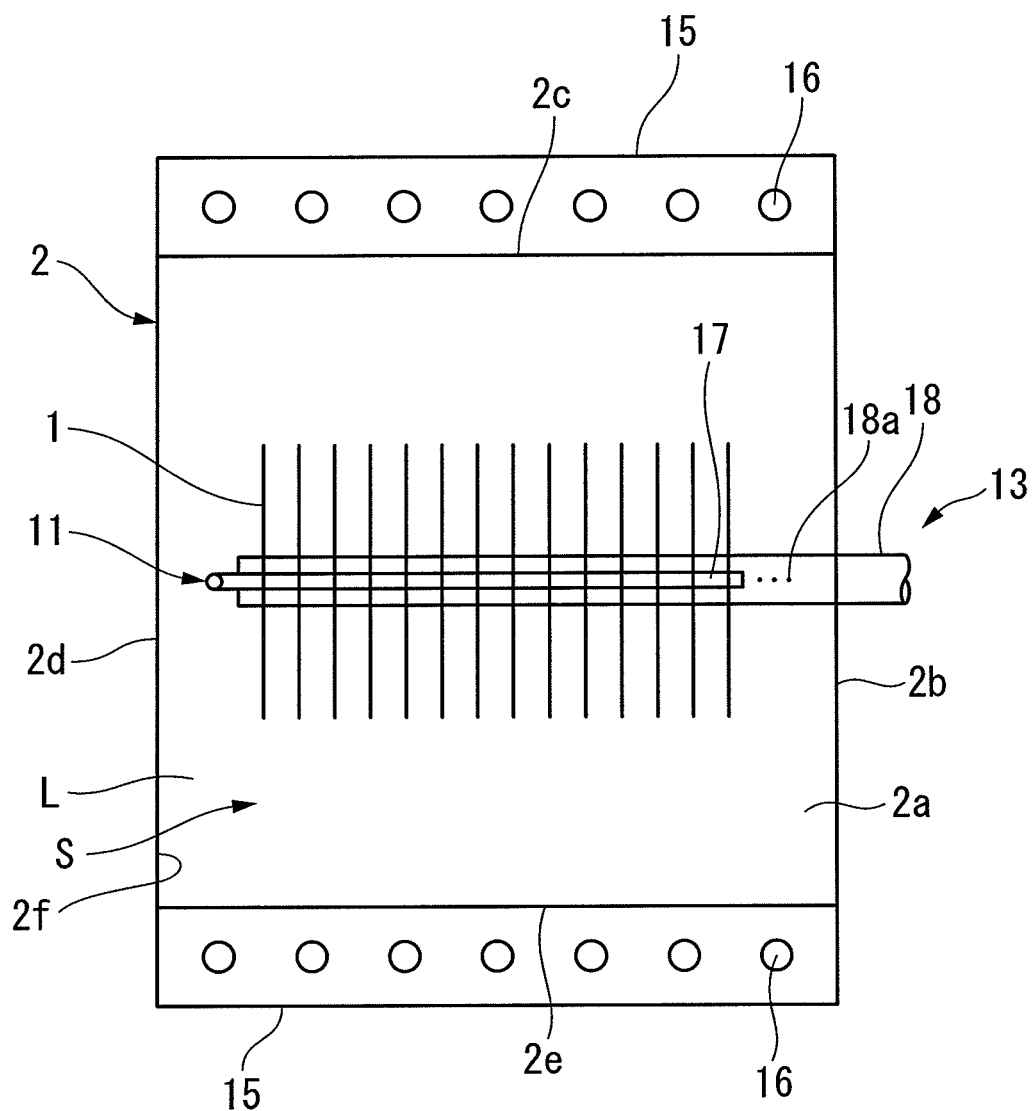
FIG. 1 is a plan view illustrating an example of a lifting and drying device according to the invention.

While preferred embodiments of the invention are described and illustrated below, it should be understood that these are exemplary of the invention and are not to be considered as limiting. Additions, omissions, substitutions, and other modifications can be made without departing from the scope of the present invention. Accordingly, the invention is not to be considered as being limited by description shown below, and is only limited by the scope of the appended claims.

Hereinafter, a lifting and drying device according to the invention and a method of manufacturing a magnetic recording medium substrate or a magnetic recording medium using the same will be described in detail by referring to the drawings.

In the lifting and drying device according to the invention, it is possible to perform a lifting and drying operation capable of preventing liquid droplets of a cleaning liquid from adhering to a surface of a substrate lifted from a surface of the cleaning liquid and preventing drying stains from being generated on a plurality of substrates with a simple structure.

Accordingly, in the method of manufacturing the magnetic recording medium substrate or the magnetic recording medium according to the invention, since the lifting and drying operation is performed after removing dust or the like adhering to the surface of the magnetic recording medium substrate or the magnetic recording medium using the lifting and drying device, it is possible to manufacture the magnetic recording medium substrate or the magnetic recording medium having a clean surface without drying stains with an excellent manufacturing yield.

Figure 2:
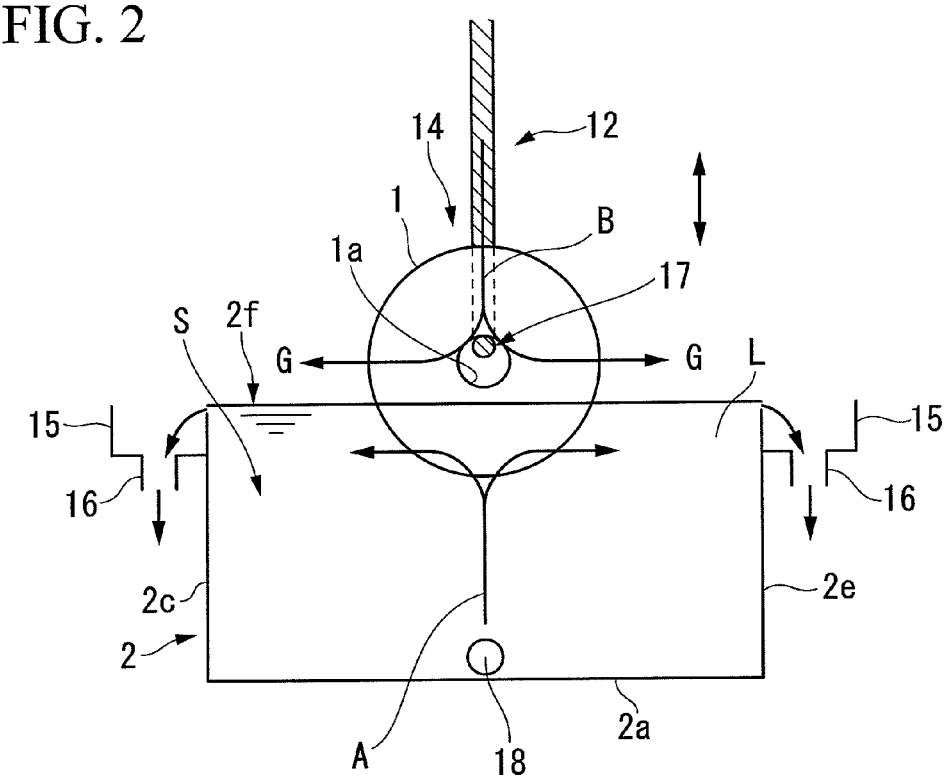
FIG. 2 is a cross-sectional view illustrating a configuration of the lifting and drying device shown in FIG. 1.
Figure 3A:
FIG. 3A is a schematic diagram illustrating the case in which liquid droplets of a cleaning liquid adhere to a surface of a substrate lifted from a surface of a cleaning liquid.
Figure 3B:
FIG. 3B is a schematic diagram illustrating the case in which liquid droplets of the cleaning liquid adhere to the surface of the substrate lifted from the surface of the cleaning liquid.
Figure 3C:
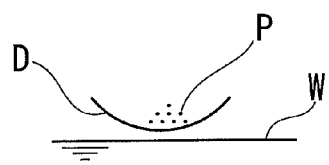
FIG. 3C is a schematic diagram illustrating the case in which liquid droplet of the cleaning liquid adhere to the surface of the substrate lifted from the surface of the cleaning liquid.

For example, as shown in FIGS. 1 and 2, the lifting and drying device according to the invention is used to clean a disk-like substrate 1 with a central hole 1a by immersing the disk-like substrate 1 into a cleaning liquid L provided in a cleaning tank 2 and lift and dry the substrate 1, and is appropriately used when lifting and drying a magnetic recording medium substrate or a magnetic recording medium using the same as the substrate 1.

Specifically, as shown in FIGS. 1 and 2, the lifting and drying device includes: a hanger mechanism 11 that is inserted through the central hole 1a of the substrate 1 and supports the plurality of substrates 1 while being hung thereon; an elevation mechanism 12 that elevates the hanger mechanism 11 between a position where the substrate 1 is immersed in the cleaning liquid L provided in the cleaning tank 2 and a position where the substrate 1 is lifted from the cleaning tank 2; an ejection mechanism 13 that is disposed inside the cleaning tank 2 and ejects the cleaning liquid L toward the substrate 1 below the hanger mechanism 11; and a blowing mechanism (not shown) that blows a dry ambient gas G to the substrate 1 lifted from the surface of the cleaning liquid L.

Furthermore, the position where the substrate 1 is immersed into the cleaning liquid L inside the cleaning tank 2 and the position where the substrate 1 is lifted from the cleaning tank 2 may be arbitrarily set. For example, the immersing position corresponds to a position where the substrate 1 is completely immersed into the cleaning liquid L and the lifting position corresponds to a position where the substrate 1 completely moves away from the cleaning liquid L. Furthermore, the elevation method may be selected as necessary, but a configuration is desirable in which the substrate is moved up and down in the direction perpendicular to the surface of the liquid.

The cleaning tank 2 includes a rectangular bottom wall 2a, four side walls 2b, 2c, 2d, and 2e uprightly formed in the periphery of the bottom wall 2a, and an opening 2f of a top surface facing the bottom wall 2a, is formed in a substantially rectangular parallelepiped shape as a whole, and forms a substantially rectangular parallelepiped space S therein to immerse the substrate 1 thereinto.

Furthermore, the cleaning liquid L provided in the cleaning tank 2 is collected at a tank 15 provided along both side surfaces 2c and 2e in the lateral direction while overflowing from the upper portion of the cleaning tank 2, and is discharged from a discharge port 16 provided at the bottom surface of the tank 15.

Furthermore, although not shown in the drawings, the lifting and drying device 1 is provided with a mechanism that re-uses the cleaning liquid L inside the cleaning tank 2 in circulation, where the mechanism includes a pump that suctions the cleaning liquid L discharged from the discharge port 16 and pressure-feeds the cleaning liquid toward an ejection mechanism 13 and a filter that filters the cleaning liquid L pressure-fed by the pump.

The hanger mechanism 11 includes an elongated support rod 17 that is inserted through the central hole 1a of the substrate 1, and the support rod 17 extends in the horizontal direction so as to be parallel to the longitudinal direction of the cleaning tank 2. Accordingly, the immersing operation is performed so that the surface of the substrate 1 is substantially perpendicular to the surface of the cleaning liquid L. Furthermore, the outer peripheral surface of the support rod 17 is provided with a peripheral groove with which the inner peripheral portion of the substrate 1 engages. Furthermore, a plurality of the grooves is provided so as to be arranged at the same interval in the longitudinal direction of the support rod 17. Therefore, the plurality of substrates 1 may be supported while being arranged toward the longitudinal direction so that the substrates are parallel to each other. Furthermore, since the inner peripheral portion of the central hole of the substrate 1 comes into contact with the grooves, the substrate 1 may be stably held.

The elevation mechanism 12 is not particularly limited as long as a mechanism may immerse the substrate 1 into the immersing tank 2 with the cleaning liquid L or lift the substrate 1 from the immersing tank 2. For example, although not shown in the drawings, a mechanism may be provided which includes a support pole supporting a base end side of the support rod 17 in a cantilever manner, a nut attached to the support pole, a lead screw fitted to the nut, and a driving motor rotationally driving the lead screw. In the mechanism, the support rod 17 is elevated with respect to the immersing tank 2, when the driving motor rotationally drives the lead screw so as to move the support pole together with the nut fitted to the lead screw in the vertical direction.

The ejection mechanism 13 includes an elongated ejection pipe 18 having a plurality of hole portions 18a arranged thereon to eject the cleaning liquid L, where the ejection pipe 18 is disposed along the bottom wall 2a of the cleaning tank 2, and is disposed to be parallel to the support rod 17 (to be parallel to the longitudinal direction of the cleaning tank 2) at a position below (directly below) the support rod 17.

Here, it is desirable to use the cleaning liquid L containing hydrogen water when cleaning the magnetic recording medium as the substrate 1.

The cleaning liquid L containing the hydrogen water is used to remove contaminants and particularly ionic impurities represented as metal corrosives that slightly remain on the surface of the magnetic recording medium and may not be removed in other cleaning processes such as vanishing, wiping, and spinning. By using the hydrogen water, it is possible to reduce corrosion of a magnetic layer containing Fe, Co and the like and remove such contaminants with high detergency.

The hydrogen water is obtained by dissolving a high-purity hydrogen gas in ultra pure water or pure water, and has an improved cleaning capability by decreasing the size of the cluster of the water. As described above, since the magnetic recording medium contains a corrosive element such as Fe or Co, the magnetic recording medium is cleaned only by a nonaqueous cleaning liquid using fluoride or the like. In the invention, since the cleaning liquid L containing the hydrogen water is used, corrosion hardly occurs in the magnetic recording medium due to the cleaning liquid L and contaminants adhering to the surface of the magnetic recording medium may be removed with high detergency. Particularly, in the invention, the effect may improve by setting the concentration of hydrogen dissolved in the hydrogen water to be from 0.1 ppm to 5 ppm and setting the oxidation reduction potential of the hydrogen water to be from −200 mV to −800 mV. Furthermore, it is more desirable that the concentration of hydrogen dissolved in the hydrogen water be from 1 ppm to 3 ppm. It is more desirable that the oxidation reduction potential of the hydrogen water be from −300 mV to −500 mV.

The blowing mechanism is not particularly limited as long as the mechanism can blow the dry ambient gas G to the substrate 1 lifted from the surface of the cleaning liquid L. For example, a mechanism may be adopted which includes a rectifier block having a length corresponding to the support rod 17 and provided with a lattice and blows dry air having a dew point of −80° C. or less from the upside of the cleaning tank 2 toward the surface of the cleaning liquid L in a laminar flow from the rectifier block and via a filter.

As the dry ambient gas G, dry air may be used. Furthermore, it is desirable to use the dry ambient gas G containing nitrogen as an inert gas when lifting and drying the magnetic recording medium.

In the lifting and drying device with the above-described structure, the plurality of substrates 1 is cleaned while the substrates 1 held by the hanger mechanism 11 are immersed into the cleaning liquid L inside the cleaning tank 2, and then the substrates 1 are lifted and dried.

Specifically, it is desirable to move the support rod 17 upward at a constant speed so that the surface of the cleaning liquid L is not shaken when lifting the plurality of substrates 1 immersed in the cleaning liquid L provided in the immersing tank 2 from the immersing tank 2. Furthermore, it is desirable that the lifting speed of the substrate 1 be from 0.01 to 30 mm/s.

In the lifting and drying device according to the invention, when the cleaning liquid L is ejected from each hole portion 18a of the ejection pipe 18 disposed in parallel to the support rod 17 at a position below (directly below) the support rod 17, the flow of the cleaning liquid L is formed as depicted by the arrow A of FIG. 2. That is, the flow is formed such that the cleaning liquid L ejected from each hole portion 18a of the ejection pipe 18 flows toward each substrate 1 from the downside to the upside, and the cleaning liquid L is divided toward both side surfaces 2c and 2e of the cleaning tank 2 in the vicinity of the surface of the liquid.

Therefore, it is possible to suppress a phenomenon in which the surface of the cleaning liquid L rises due to the surface tension at the time when the substrate 1 moves away from the surface of the cleaning liquid L. This is because the surface rising due to the surface tension is alleviated by the dispersion of the flow of the cleaning liquid L in the lateral direction. Accordingly, in the invention, it is possible to prevent a problem in which the rising cleaning liquid L bursts and bursting liquid droplets adhere to the surface of the substrate 1 again. Furthermore, in order to obtain such an effect, it is desirable that the flow rate of the cleaning liquid L ejected from each hole portion 18a of the ejection pipe 18 be from 0.1 to 100 cm/s. It is more desirable that the flow rate be from 1 to 10 cm/s.

Furthermore, in the lifting and drying device according to the invention, the blowing mechanism blows the dry ambient gas G to each substrate 1 lifted from the surface of the cleaning liquid L. Therefore, for example, the flow of the dry ambient gas G depicted by the arrow B of FIG. 2 is formed. That is, the flow is formed such that the dry ambient gas G ejected from the blowing mechanism flows toward the surface of the cleaning liquid L from the upside to the downside, and the dry ambient gas G is divided toward both side surfaces $2c$ and $2e$ of the cleaning tank 2. When seen from the cross-section of the drying device, it is desirable that the flow formed by the blowing mechanism to be directed to the downside and the flow formed by the ejection of the cleaning liquid to be directed to the upside be parallel to each other or present on the same line, but the invention is not limited thereto as long as the effect of the invention is obtained.

Therefore, generally, the surface of the liquid rising due to the surface tension at the time when the substrate 1 moves away therefrom is alleviated by being pressed by the flow of the dry ambient gas G. Furthermore, even when liquid droplets are formed at the time when the substrate 1 moves away from the surface of the cleaning liquid L, the liquid droplets are pressed down before adhering thereto, thereby preventing the liquid droplets of the cleaning liquid L from adhering to the surface of each substrate 1. Furthermore, in order to obtain such an effect, it is desirable that the flow rate of the dry ambient gas G ejected from the blowing mechanism be from 0.1 to 50 cm/s. It is more desirable that the flow rate be from 1 to 20 cm/s.

As described above, in the lifting and drying device according to the invention, it is possible to perform a lifting and drying operation capable of preventing liquid droplets of the cleaning liquid L from adhering to the surface of each substrate 1 lifted from the surface of the cleaning liquid L and preventing drying stains from being generated on the plurality of substrates 1 with a simple structure.

(Method of Manufacturing Magnetic Recording Medium Substrate)

The magnetic recording medium substrate according to the invention is a disk-like substrate with a central hole, and the magnetic recording medium is formed by sequentially laminating a magnetic layer, a protective layer, a lubricating layer, and the like on the surface of the substrate. Furthermore, in a magnetic recording reproducing device (HDD), the center portion of the magnetic recording medium is attached to a rotary shaft of a spindle motor, and a magnetic head runs in a floating state on the surface of the magnetic recording medium rotationally driven by the spindle motor. In the meantime, information is written to or read from the magnetic recording medium.

As the magnetic recording medium substrate, an aluminum alloy substrate or a glass substrate may be exemplified. Among them, the glass substrate generally has excellent hardness, surface flatness, rigidity, and impact resistance compared to the aluminum alloy substrate.

As the glass substrate for the magnetic recording medium, for example, $SiO_2$—$Al_2O_3$—$R_2O$ (R indicates at least one type or more selected from alkali metal elements)-based chemically strengthened glass, $SiO_2$—$Al_2O_3$—$Li_2O$-based glass ceramics, $SiO_2$—$Al_2O_3$—$MgO$—$TiO_2$-based glass ceramics, or the like may be used. Among them, particularly, chemically strengthened $SiO_2$—$Al_2O_3$—$MgO$—$CaO$—$Li_2O$—$Na_2O$—$ZrO_2$—$Y_2O_3$—$TiO_2$—$As_2O_3$-based glass, chemically strengthened $SiO_2$—$Al_2O_3$—$Li_2O$—$Na_2O$—$ZrO_2$—$As_2O_3$-based glass, $SiO_2$—$Al_2O_3$—$MgO$—$ZnO$—$Li_2O$—$P_2O_5$—$ZrO_2$—$K_2O$—$Sb_2O_3$-based glass ceramics, $SiO_2$—$Al_2O_3$—$MgO$—$CaO$—$BaO$—$TiO_2$—$P_2O_5$—$As_2O_3$-based glass ceramics, $SiO_2$—$Al_2O_3$—$MgO$—$CaO$—$SrO$—$BaO$—$TiO_2$—$ZrO_2$—$Bi_2O_3$—$Sb_2O_3$-based glass ceramics, and the like may be appropriately used. Furthermore, for example, glass ceramics containing a crystal phase of lithium disilicate, $SiO_2$-based crystal (quartz, cristobalite, tridymite, or the like), cordierite, enstatite, aluminum magnesium titanate, spinel crystals ([Mg and/or Zn]$Al_2O_4$, [Mg and/or Zn]$_2TiO_4$, and a solid solution between two crystals), forsterite, spodumene, and a solid solution between these crystals may be appropriately used as the glass substrate for the magnetic recording medium.

Then, when manufacturing the glass substrate for the magnetic recording medium, a glass substrate with a central hole is first obtained by cutting a glass substrate from a large sheet-like glass plate or directly press-molding a glass substrate from molten glass using a molding die.

Next, lapping (grinding) and polishing (sanding) are performed on the obtained glass substrate. Then, the glass substrate subjected to lapping, grinding, and polishing is sent to a final cleaning and inspecting process.

Then, in the final cleaning process, the glass substrate is cleaned by using the cleaning device (the lifting and drying device) of the invention, and a polishing agent and the like used in the above-described process is removed. Furthermore, in the inspecting process, the surface of the glass substrate is inspected by using, for example, an optical inspecting device using a laser so as to check if there is a flaw or a strain on the surface (the main surface, the end surface, and the chamfered surface).

(Method of Manufacturing Magnetic Recording Medium)

Furthermore, in the invention, the magnetic recording medium obtained by sequentially laminating a magnetic layer, a protective later, and the like on the surface of the magnetic recording medium substrate may be subjected to a cleaning process using the cleaning device (the lifting and drying device) of the invention.

In the magnetic recording medium manufactured according to the invention, an in-plane magnetic layer or a perpendicular magnetic layer may be used as the magnetic layer formed on the surface of the magnetic recording medium substrate. It is desirable that such a magnetic layer be formed of alloy mainly containing Co. Furthermore, the magnetic layer is generally formed as a thin film by sputtering.

As the magnetic layer for a longitudinal magnetic recording medium, for example, a laminated structure including a nonmagnetic CrMo underlying layer and a ferromagnetic CoCrPtTa magnetic layer may be used. On the other hand, as the magnetic layer for a perpendicular magnetic recording medium, for example, a laminated structure may be used which is obtained by laminating a backing layer formed of soft magnetic FeCo alloy (FeCoB, FeCoSiB, FeCoZr, FeCoZrB, FeCoZrBCu, or the like), FeTa alloy (FeTaN, FeTaC, or the like), Co alloy (CoTaZr, CoZrNB, CoB, or the like), or the like, and an alignment control film of Ni alloy or the like. If necessary, the laminated structure may further include an intermediate film of Ru or the like and a magnetic layer formed of 60 Co-15Cr-15 Pt alloy or 70 Co-5Cr-15Pt-10 $SiO_2$ alloy.

As the protective layer formed on the magnetic layer, a method of forming a thin film of Diamond Like Carbon using P-CVD or the like is generally used, but the invention is not particularly limited thereto.

In the invention, dust or the like adhering to the surface of the magnetic recording medium substrate or the magnetic recording medium is removed by using the cleaning device (the lifting and drying device) of the invention, and then lifting and drying is performed, thereby manufacturing the magnetic recording medium substrate or the magnetic recording medium having a clean surface without drying stains with excellent manufacturing yield.

EXAMPLES

Hereinafter, the effect of the invention will become more apparent from the Examples. Furthermore, the invention is Examples, and may be appropriately modified without departing from the spirit of the invention.

Example 1-1

As the cleaning device of the invention, a stainless cleaning tank having the same structure as that of the cleaning tank 2 shown in FIGS. 1 and 2 and having a length of 35 cm, a width of 25 cm, and a height of 25 cm was used. The bottom portion of the cleaning tank was provided with an ejection pipe having a diameter of 15 mm and a length of 30 cm and provided with 20 nozzle holes each having a diameter of 3 mm and ejecting a cleaning liquid upward. The cleaning liquid was ejected from each ejection nozzle hole of the ejection pipe at the flow rate of 3 cm/s, so that the flow of the cleaning liquid L was formed as depicted by the arrow A of FIG. 2. As the cleaning liquid, hydrogen water having a dissolved hydrogen concentration of 1.5 ppm and an oxidation reduction potential of −550 mV was used.

Then, the substrate is cleaned by using the cleaning device. As the substrate, an aluminum alloy substrate subjected to nickel/phosphorus plating, having an outer diameter of 65 mm and a thickness of 1.27 mm, and having a central hole of a diameter of 20 mm was used. While the substrate was hung on the support rod 25, the substrate was immersed into the cleaning liquid inside the cleaning tank, and 500 W of an ultrasonic vibration was applied to the cleaning liquid to clean the substrate for 30 seconds. Subsequently, the ultrasonic vibration was stopped, and the support rod was lifted at 3 mm/s to lift and dry the substrate. When the substrate was lifted and dried, dry air having a dew point of −80° C. was blown in a laminar flow having a width of 20 mm and a length of 30 cm from a position above the cleaning tank toward the surface of the cleaning liquid at the flow rate of 8 cm/s through a filter of a rectifier block provided with 5 mm of a lattice in the direction in which 25 substrates are hung, while the support rod was lifted.

Then, the surface of each dried substrate was observed by a differential interference microscope (600 times), no attachment such as a water stain or irregular drying was found on the surface of any substrate.

Comparative Example 1-1

In Comparative Example, the substrate was cleaned in the same manner as that of Example, but the flow of the cleaning liquid was not controlled in the cleaning tank as in Example, and the same amount of cleaning liquid as that of Example was simply supplied from three supply ports provided at the bottom portion. Specifically, an ejection pipe 18 as shown in FIGS. 1 and 2 was used, except that three hole portions 18a were provided such that a supply port was provided at a center position of the bottom portion of the tank, and two supply ports were provided at positions which are symmetrically and equally separated from the center position toward the both sides of the bottom portion by 10 cm. The diameter of the supply ports was 15 mm. The cleaning device of Comparative Example 1-1 had a small number of supply ports, and the diameter of the supply ports was large. Therefore, a flow of the cleaning liquid was generated, wherein the cleaning liquid discharged from the supply ports flows toward the direction where the substrates did not exist, and unstable convection was generated in the cleaning liquid in the cleaning tank. Furthermore, the convection of the dry air was not generated in the vicinity of the surface of the cleaning liquid. That is, the entire space of the cleaning device wherein the space was located at the upper portion of the immersing space was installed under the atmosphere of the dry air, and the substrate was dried by simply lifting the substrate without performing the particular lifting and drying of the substrate as in Example 1-1.

Then, the surface of each dried substrate was observed by a differential interference microscope (600 times), and a plurality of drying stains each having a diameter of 0.2 mm or so were observed at the outer peripheral ends of five substrates.

Example 2-1

In Example 2-1, 1000 magnetic recording medium substrates (hereinafter, referred to as cleaned substrates) cleaned by using the cleaning method of Example 1-1 were prepared, and the cleaned substrates were used to manufacture the magnetic recording medium.

Specifically, the cleaned substrate was first received in a film forming chamber of a DC magnetron sputter device (C-3040 manufactured by Anelva Corporation), and the inside of the film forming chamber was evacuated through pressure reduction until the vacuum degree reached $1 \times 10^{-5}$ Pa. Subsequently, an adhesive layer with a thickness of 10 nm was formed on the substrate by using a target of 60Cr-40Ti. Furthermore, a soft magnetic layer with a thickness of 34 nm was formed on the adhesive layer by using a target of 46Fe-46Co-5Zr-3B {46 atom % of Fe, 46 atom % of Co, 5 atom % of Zr, and 3 atom % of B} at a substrate temperature of 100° C. or less. An Ru layer with a thickness of 0.76 nm was formed on the layer, a soft magnetic layer with a thickness of 34 nm was further formed by using a target of 46Fe-46Co-5Zr-3B, and this was used as a soft magnetic underlying layer.

Next, an NiW layer with a thickness of 5 nm and an Ru layer with a thickness of 2 nm were sequentially formed on the soft magnetic underlying layer by using a target of Ni-10W {6 atom % of W and a remainder of Ni} and a target of Ru, and this was used as an alignment control layer.

Next, respective layers of 92(70Co15Cr15Pt)-8SiO$_2$ (with an average film thickness of 3 nm), 93(75Co10Cr15Pt)-5SiO$_2$-2TiO$_2$ (with an average film thickness of 3 nm), Ru (with an average film thickness of 0.3 nm), and 65Co15Cr15Pt5B (with an average film thickness of 3 nm) were sequentially laminated as a magnetic layer with a multilayer structure on the alignment control layer.

Next, a carbon protective layer with a thickness of 2.5 nm was formed on the magnetic layer by CVD.

Example 2-2

In Example 2-2, 500 magnetic recording media among 1000 magnetic recording media manufactured in Example 2-1 were cleaned by using the same method as that of Example 1-1. Furthermore, each magnetic recording medium was cleaned for 15 seconds.

Example 2-3

In Example 2-3, 500 magnetic recording media which were not cleaned in Example 2-1 among 1000 magnetic recording media manufactured in Example 2-1 were cleaned by using the same method as that of Comparative Example 1-1. Furthermore, each magnetic recording medium was cleaned for 15 seconds.

Example 2-4

In Example 2-4, 500 substrates cleaned by the cleaning method of Comparative Example 1-1 were prepared, and the cleaned substrates were used to manufacture the magnetic recording medium by using the same method as that of Example 2-1. Then, the manufactured magnetic recording medium was cleaned by using the same method as that of Example 1-1. Furthermore, each magnetic recording medium was cleaned for 15 seconds.

Comparative Example 2-1

500 substrates cleaned by using the cleaning method of Comparative Example 1-1 were prepared, and the cleaned substrates were used to manufacture the magnetic recording medium by using the same method as that of Example 2-1. Then, the manufactured magnetic recording medium was cleaned by using the same method as that of Comparative Example 1-1. Furthermore, each magnetic recording medium was cleaned for 15 seconds.

(Manufacture and Evaluation of Magnetic Recording Medium)

Then, in each magnetic recording medium of Examples 2-2, 2-3, and 2-4 and Comparative Example 2-1, a lubricating film formed of perfluoropolyether was formed on the surface of the protective layer to have a thickness of 15 angstrom through dipping.

Next, wiping was performed on the magnetic recording medium provided with the lubricant film. At this time, as a wiping tape, a tape formed of a splittable conjugate fiber made of nylon resin and polyester resin to have a line diameter of 2 μm was used. Furthermore, the wiping was performed on the condition in which the number of rotations of the magnetic recording medium was set to 300 rpm, the feeding speed of the wiping tape was set to 10 mm/s, the pressing force for pressing the wiping tape against the magnetic recording medium was set to 98 mN, and the processing time was set to 5 seconds.

Next, vanishing was performed on the magnetic recording medium subjected to the wiping. At this time, as a vanishing tape, a tape was used in which crystal growth type alumina particles having an average diameter of 0.5 μm were fixed to a film formed of polyethylene terephthalate by an epoxy resin. Furthermore, the vanishing was performed on the condition in which the number of rotations of the magnetic recording medium was set to 300 rpm, the feeding speed of the polishing tape was set to 10 mm/s, the pressing force for pressing the polishing tape against the magnetic disk was set to 98 mN, and the process time was set to 5 seconds.

Next, a glide inspection was performed for each magnetic recording medium. In the glide inspection, a mechanical spacing between the inspection head and the surface of the magnetic recording medium was set to 0.25 micro inches, when a signal is output from the inspection head due to a collision against the protrusion of the surface of the magnetic recording medium, it is determined that the magnetic recording medium is a defective product, and in other cases, it is determined that the magnetic recording medium is a non-defective product.

Next, a certifying inspection was performed for the magnetic recording medium passing the glide inspection. In the certifying inspection, a TuMR head was used as a magnetic head. Then, the subject inspection medium was rotated at 6000 rpm. In the meantime, a 320 kFCI of high frequency signal was written at 6 μm of a track pitch from the outermost periphery of the data area to the innermost peripheral area in the subject inspection medium by using the magnetic head, and then the output signal from the subject inspection medium was analyzed.

The output signal was analyzed by checking the number of missing positions (positions where written signals are not output) longer than 15 μm, missing positions from 15 μm to 0.8 μm, and missing positions less than 0.8 μm in a circumferential width. The total evaluation result is shown in Table 1.

TABLE 1

| | Method of cleaning substrate | Method of cleaning magnetic recording medium | Missing position during certifying inspection in entire inspection tracks (average number of one track) | | | Missing position during certifying inspection in 100 inspection tracks from outermost periphery (average number of one track) | | |
|---|---|---|---|---|---|---|---|---|
| | | | >15 μm | 15~0.8 μm | <0.8 μm | >15 μm | 15~0.8 μm | <0.8 μm |
| Example 2-1 | Example 1-1 | Example 1-1 | 0.00007 | 0.00049 | 0.00124 | 0.00018 | 0.00163 | 0.00325 |
| Example 2-2 | Example 1-1 | Comparative example 1-1 | 0.00035 | 0.00085 | 0.00170 | 0.00110 | 0.00177 | 0.00459 |
| Example 2-3 | Comparative example 1-1 | Example 1-1 | 0.00039 | 0.00113 | 0.00261 | 0.00124 | 0.00279 | 0.00537 |
| Comparative example 2-1 | Comparative example 1-1 | Comparative example 1-1 | 0.00060 | 0.00141 | 0.00367 | 0.00219 | 0.00367 | 0.00739 |

As shown in Table 1, a satisfactory result is obtained when using the cleaning method of the invention compared to the cleaning method of Comparative Example.

DESCRIPTION OF THE REFERENCE SYMBOLS

1: Substrate
1a: Central hole
2: Cleaning tank
2a: Bottom wall
2b, 2c, 2d, 2e: Side surface
2f: Opening
11: Hanger mechanism
12: Elevation mechanism
13: Ejection mechanism
14: Hanged substrates
15: Tank
16: Discharge port
17: Support rod
18: Ejection pipe
18a: Hole portion
A: Flow of a cleaning liquid
B: Flow of dry ambient gas
D: Substrate
G: Dry ambient gas
L: Cleaning liquid
P: Liquid droplets adhered to a substrate
S: Immersing space
W: Pure water

The invention claimed is:

1. A method of manufacturing a magnetic recording medium substrate, the method comprising:
cleaning the magnetic recording medium substrates using a lifting and drying device for cleaning a substrate by immersing one or more disk-like substrates with a central hole into a cleaning liquid disposed in a cleaning tank, and lifting and drying the substrate, the lifting and drying device comprising:
a hanger mechanism that is inserted through the central hole of the substrates and supports the substrates while being hung thereon;
an elevation mechanism that elevates the hanger mechanism between a position where the substrates are immersed into the cleaning liquid inside the cleaning tank and a position where the substrates are lifted from the cleaning tank;
an ejection mechanism that is disposed in the cleaning tank and ejects the cleaning liquid from the downside of the hanger mechanism toward the substrates; and
a blowing mechanism that blows a dry ambient gas on the substrates lifted from the surface of the cleaning liquid from the upside thereof;
wherein
the ejection mechanism is an mechanism wherein the ejected cleaning liquid flows, from the downside to the upside, toward a position where the lifted substrates move away from the surface of the cleaning liquid, and the cleaning liquid is divided toward both side surfaces of the cleaning tank in the vicinity of the surface of the liquid, and
the blowing mechanism is an mechanism wherein the dry ambient gas is blown at a position where the lifted substrates move away from the surface of the cleaning liquid, so that the dry ambient gas flow toward the surface of the cleaning liquid from the upside to the downside, and the dry ambient gas is divided toward both side surfaces of the cleaning tank.

2. A method of manufacturing a magnetic recording medium, the method comprising:
cleaning the magnetic recording medium using a lifting and drying device for cleaning a substrate by immersing one or more disk-like substrates with a central hole into a cleaning liquid disposed in a cleaning tank, and lifting and drying the substrate, the lifting and drying device comprising:
a hanger mechanism that is inserted through the central hole of the substrates and supports the substrates while being hung thereon;
an elevation mechanism that elevates the hanger mechanism between a position where the substrates are immersed into the cleaning liquid inside the cleaning tank and a position where the substrates are lifted from the cleaning tank;
an ejection mechanism that is disposed in the cleaning tank and ejects the cleaning liquid from the downside of the hanger mechanism toward the substrates; and
a blowing mechanism that blows a dry ambient gas on the substrates lifted from the surface of the cleaning liquid from the upside thereof;
wherein
the ejection mechanism is an mechanism wherein the ejected cleaning liquid flows, from the downside to the upside, toward a position where the lifted substrates move away from the surface of the cleaning liquid, and the cleaning liquid is divided toward both side surfaces of the cleaning tank in the vicinity of the surface of the liquid, and
the blowing mechanism is an mechanism wherein the dry ambient gas is blown at a position where the lifted substrates move away from the surface of the cleaning liquid, so that the dry ambient gas flow toward the surface of the cleaning liquid from the upside to the downside, and the dry ambient gas is divided toward both side surfaces of the cleaning tank.

3. The method according to claim 1, wherein the lifting speed of the substrates is from 0.01 to 30 mm/s.

4. The method according to claim 1, wherein the flow rate of the cleaning liquid ejected from the ejection mechanism is from 0.1 to 100 cm/s.

5. The method according to claim 1, wherein the flow rate of the dry ambient gas ejected from the blowing mechanism is from 0.1 to 50 cm/s.

6. The method according to claim 1, wherein the cleaning liquid contains hydrogen water.

7. The method according to claim 1, wherein the substrates are magnetic recording medium substrates or magnetic recording media.

8. The method according to claim 1, wherein the ejection mechanism ejects the cleaning liquid from a position directly below the substrates.

* * * * *